United States Patent [19]

Isobe et al.

[11] 4,448,496

[45] May 15, 1984

[54] ZOOM LENS ASSEMBLY HAVING A MECHANICAL LENS SYSTEM MOUNTING MECHANISM OPERATIVE TO ENABLE CLOSEUP OPERATION

[75] Inventors: Takashi Isobe, Kanagawa; Shigeru Kamata, Tokyo, both of Japan

[73] Assignee: Canon Kabushiki Kaisha, Tokyo, Japan

[21] Appl. No.: 440,716

[22] Filed: Nov. 10, 1982

Related U.S. Application Data

[63] Continuation of Ser. No. 192,828, Oct. 1, 1980, abandoned.

[30] Foreign Application Priority Data

Oct. 11, 1979 [JP] Japan ............................... 54-131126
Dec. 13, 1979 [JP] Japan ............................... 54-161871

[51] Int. Cl.³ .............................................. G02B 7/10
[52] U.S. Cl. ................................................ 350/430
[58] Field of Search .............................. 350/430, 429

[56] References Cited

U.S. PATENT DOCUMENTS 4,089,590 5/1978 Sakata ............................. 350/430

*Primary Examiner*—Jon W. Henry
*Attorney, Agent, or Firm*—Toren, McGeady and Stanger

[57] ABSTRACT

A zoom lens assembly having a mechanical mounting system for the lens components thereof wherein zooming, focusing and closeup operations may be selectively performed by operation of a single actuator member. A lens barrel is provided within which a variator lens and a compensator lens are movably fitted with an intermediate sleeve being fitted on the barrel member and arranged to move axially in unison with the actuator member and to be rotatable relative thereto, a drive connection being provided between the actuator member and the variator lens holder member with motion transmission occurring between the intermediate sleeve and the compensator lens holder member. Focusing operation is effected by rotation of the actuator member and by axial movement of the actuator member, the compensator lens and the variator lens are axially moved with a compensation effect being maintained for the optical system by relative movement between the variator lens and the compensator lens.

4 Claims, 19 Drawing Figures

ZOOM LENS ASSEMBLY HAVING A MECHANICAL LENS SYSTEM MOUNTING MECHANISM OPERATIVE TO ENABLE CLOSEUP OPERATION

This is a continuation of application Ser. No. 192,828, filed Oct. 1, 1980 now abandoned.

BACKGROUND OF THE INVENTION

The present invention relates generally to zoom lens assemblies and, more particularly, to a mechanical mounting system for a zoom objective in cameras, particularly an assembly wherein the built-in zoom objective mounting mechanism enables closeup operation.

In mechanical mounting systems for camera objectives, it is known to provide a mechanism for enabling closeup operation in addition to a focusing control mechanism for an ordinary range of object distances. In the case of zoom objectives in zoom-type lens assemblies, it is also known to provide a zoom control mechanism having provision therein for closeup operation. In this conventional type of mechanical mounting system, the control mechanism for focusing and/or zooming and the mechanism for closeup operation are arranged independently of each other and there necessarily results the need for a complicated mechanical interlock therebetween. This results in a substantial increase in the complexity of the structure and it also causes the operation thereof to be troublesome, thereby preventing an operator from quick and easy management of the camera.

Accordingly, significant advantages may be derived from a system such as that of the present invention having characteristic features wherein only a single actuator member may be sufficient to perform the three different operations involved; namely, focusing, zooming and closeup operation, whereby it is not necessary to provide for manually operated changeover means to enable these three ranges of performance.

It is known to provide an arrangement wherein single-actuator operation is possible. However, in order to select the closeup range, the actuator must be further rotated beyond the focusing range so that the focusing member, the variator lens and the compensator lens, and in some cases a portion of the relay lens, will be moved forwardly and will be released from connection with the stationary barrel of the lens assembly. For this purpose, it is required to utilize a releasable connecting device which is rendered operative when the actuator is moved from the focusing range to the closeup range or vice versa. This casues significant increase in the complexity of the structure of the lens mounting mechanism. From a manufacturing standpoint, because of the increase in the number of constituent parts which are necessary, there arise problems in that the machining processes are increased with regard to the number of steps which must be effected to meet the required tolerances of the individual parts. The resultant increases in assembly steps and inspection steps thereby cause unit production costs to increase so that an increase in the number of control phases due to increase in the number of constituent parts is also encountered. This contributes to an increase in the production cost and, from a production management standpoint, quality control and endurance are difficult to maintain constant at an acceptable level due to the greater number of constituent parts involved.

From the point of view of the ultimate user of such a lens assembly, complaints will arise due to the larger bulk and size of the equipment and due to the heavy weight which will result thereby causing inconvenience with regard to quick and easy management of the equipment and to its portability.

Furthermore, from the aspect of the structure of the barrel for the zoom lens assembly and for the lens optical system, it becomes necessary to increase the amount of movement through which the variator lens must move in the direction of the optical axis in order to increase zoom magnification. In such a case, it is difficult to adjust the engagement of the fixed lens barrel and the lens holder member of the variator lens. Also, when the amount of movement of the variator lens is increased, the degree of movement of the compensator lens is limited and greater difficulties are encountered in improving performance from a structural and optical viewpoint. Additionally, when the degree of movement of the variator and the compensator lens groups is increased, the entire length of the lens barrel must be increased thereby detracting from the compactness of the structure.

Accordingly, demands have been made for a barrel structure wherein the degree of movement of the variator lens group in the direction of the optical axis may be permitted to occur in accompaniment with the movement of the compensator lens.

Additionally, if a zoom lens is provided with the additional function of closeup photography, an advantage arises because the range of use may be increased. In such a case, it is desirable to provide a structure wherein focusing, zooming and closeup photography may be continuously performed by a single operation member, as hereinbefore mentioned.

Particularly when changing the zooming state of the lens to a condition for closeup photography, it is necessary to shift the variator lens groups continuously further away from the zooming position by continuous operation of the operator member from zooming to closeup range. This has not been successfully achieved in conventional structures of the prior art and a demand has arisen for a new barrel structure for this purpose.

Accordingly, the present invention is directed toward provision of a closeup control mechanism for a zoom lens assembly which would permit three different types of operations for zooming, focusing and closeup to be consecutively performed by a single actuator ring or sleeve.

The invention is further directed toward provision of a mechanical mounting system for a zoom objective which is constructed in as simple a form as possible and which is, therefore, amenable to low cost unit production techniques and which will enable an operator to effect film exposure without missing the opportunity to photograph an object inasmuch as quick transition from one of the three operating ranges to another may be effected in an assembly which includes the provision for closeup operation.

A further goal of the invention is to provide a zoom lens mounting mechanism of the type wherein axial movement of a single actuator member may cause variation in focal length of the optical system while simultaneously producing an image shift compensating effect.

SUMMARY OF THE INVENTION

Briefly, the present invention may be described as a zoom lens assembly which is capable of being operated by manipulation of a single actuator member comprising a lens barrel member having first and second lens holder members operatively fitted in realtionship therewith for mounting, respectively, variator lens means and compensator lens means, an actuator member, an intermediary sleeve arranged between said actuator member and said lens barrel member axially movably integrated with said actuator member and rotatable relative thereto, means interconnecting the actuator member with said first lens holder member, and control means for controlling the axial movement of the second lens holder member, with said first and second lens holder members being capable of movement relative to each other to effect compensation for the optical system in correspondence with the magnification variation resulting from movement of the variator lens.

In one embodiment of the invention, axial movement of the variator lens and compensator lens is governed by a cylindrical cam member having slots wherein there are engaged respective cam followers radially extending from the holders for the variator lens and the compensator lens. Since such a cam arrangement is unavoidably associated with a looseness or play of the follower in the camming slot, the present invention aims to provide a mechanism which assures correct movement of the cam follower along the prescribed camming edge of the slot by preventing fluctuation and play of the follower pin in the space of the slot.

Furthermore, since the zoom lens mounting mechanism of the type described may take a form such that the amount of axial movement of the actuator is equal to that of the variator, an optical system of the zoom type requires that the variator and compensator be moved axially, but in variable or differential relationship to each other. Thus, there is a need for providing a direct drive connection between the actuator member and the variator holding member. When the zoom lens mounting mechanism is structured with a closeup control mechanism, however, the complexity of the structure of the mounting system is significantly increased and there thus results an increase in the difficulty of assembling the parts with the required accuracy.

With consideration toward quick and easy management of the zoom lens including the closeup provision, it has been shown that the most suitable arrangement of the actuator is such that rotation about the optical axis causes focusing operation while axial movement may effect zooming operation with further rotation beyond the focusing range being effective for closeup operation.

However, use of such an arrangement in a lens mounting system which essentially comprises an actuator, a cam cylinder, a tubular body or lens barrel and lens cells or holding members containing the variator and the compensator necessitates the provision of means for connecting the actuator and the lens cells across the tubular body or lens barrel. It has been found that the form provided for this connecting means significantly affects the imaging performances, particularly in zooming and closeup range.

Thus, the present invention operates to eliminate many of the drawbacks of the prior art and to provide connecting means such that while the variator cell is connected to the actuator by the connecting means, motion of the connecting means in the axial direction is transmitted to effect motion of the variator cell.

The various features of novelty which characterize the invention are pointed out with particularity in the claims annexed to and forming a part of this disclosure. For a better understanding of the invention, its operating advantages and specific objects attained by itw use, reference should be had to the accompanying drawings and descriptive matter in which there are illustrated and described preferred embodiments of the invention.

DESCRIPTION OF THE PREFERRED EMBODIMENTS

Figure 1:
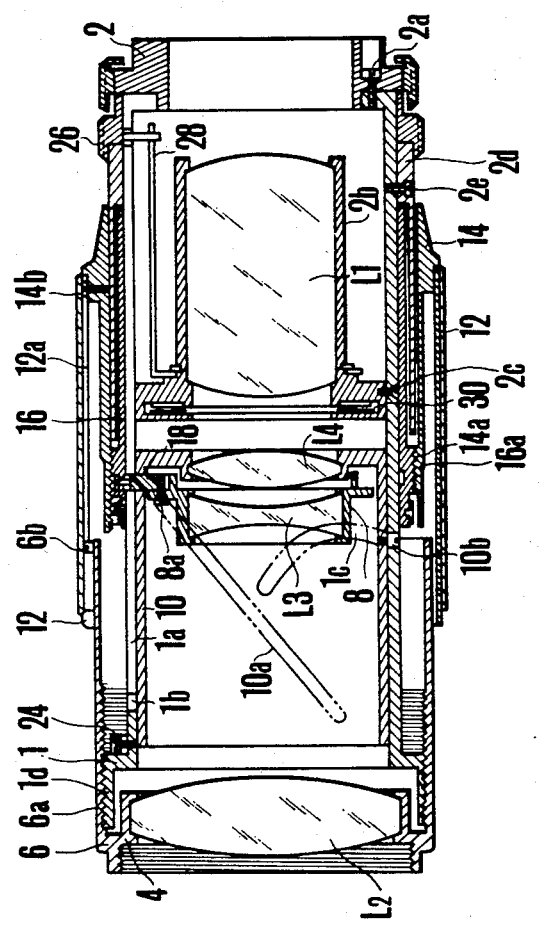
FIG. 1 is a longitudinal sectional view of a zoom lens assembly having a mounting mechanism in accordance with the present invention shown set in the position for the longest focal length.

The embodiments of the invention will be described by reference to the accompanying drawings, wherein like reference numerals are used to refer to similar parts in the various figures thereof, with the embodiments described being assumed to be adapted for use in an interchangeable lens assembly for a single lens reflex camera. Referring now to the drawings, and particularly to FIGS. 1-3 and 4a–4b, a first embodiment of the invention is shown as comprising a tubular body or lens barrel member 1 with a mount member 2 for mounting of the lens assembly having coupling means (not shown)

thereon for attachment of the lens assembly to a camera body (not shown) affixed thereto at the rear end thereof by fastener screws 2a. The mount member 2 contains a first or relay lens group L1 located in a portion thereof.

Figure 4A:
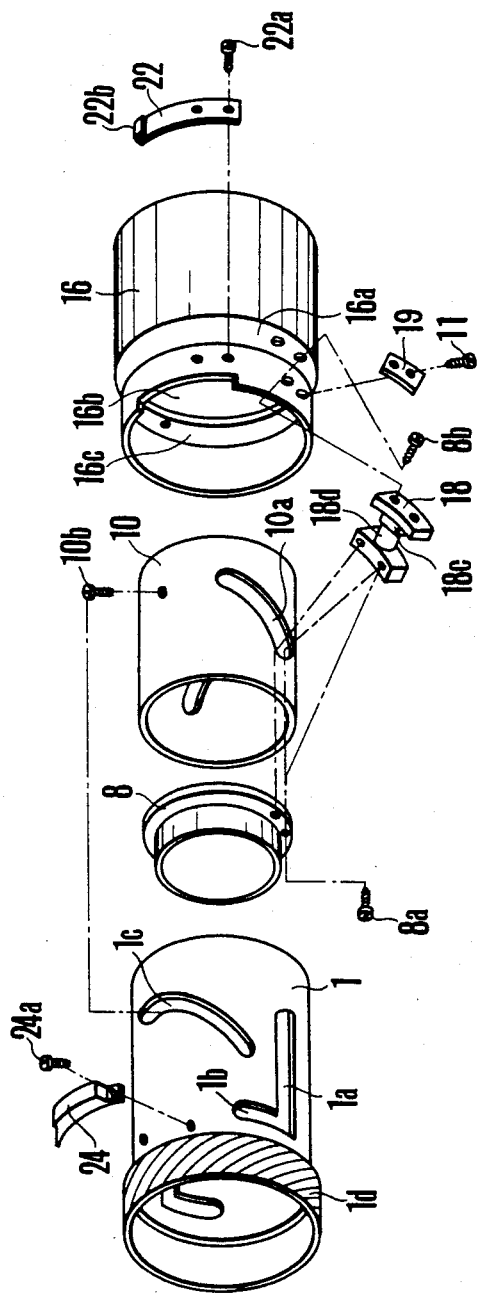
FIGS. 4a and 4b constitute an exploded perspective view of a zoom lens mounting mechanism in accordance with the invention with FIG. 4a depicting a tubular body or lens barrel, a lens cell or holder for a third or variator lens group, a lens cell for a fourth or compensator lens group, a zoom sleeve, and with FIG. 4b depicting an intermediate sleeve, an actuator member, and a front barrel member.
Figure 4B:
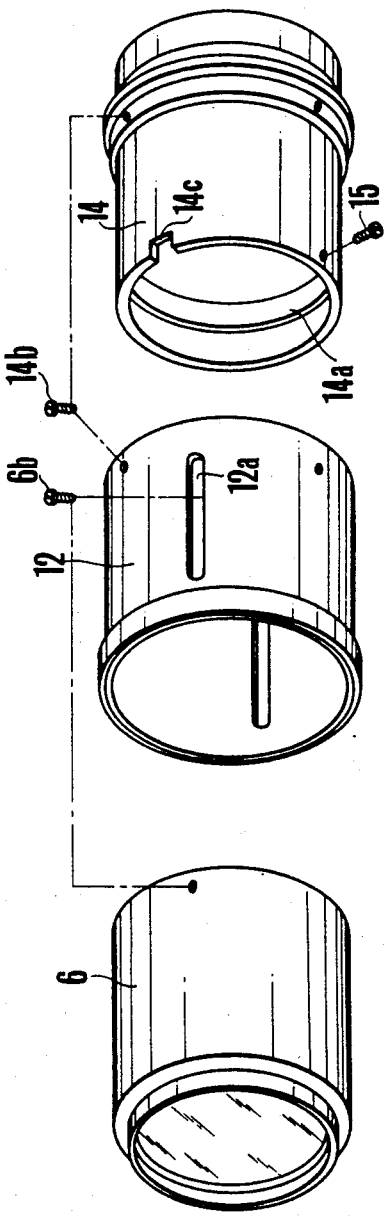
Figure 5:
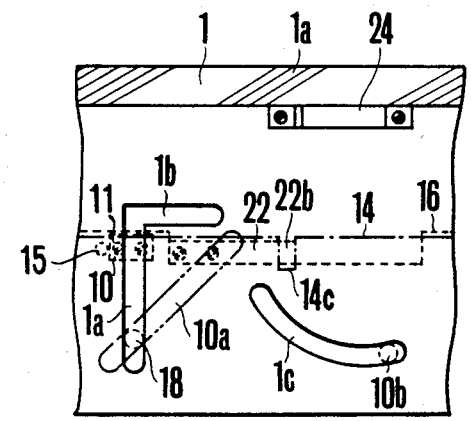
FIGS. 5–7 are developed representations showing the operating conditions of connecting means and lens cells at three different stations of the actuator member for telephoto, wide angle and closeup settings, respectively.

With reference to FIG. 4a, the lens barrel member 1 is formed with a straight axial slot 1a, a transverse slot 1b contiguous with the axial slot 1a, and with an arcuate slot 1c for controlling axial movement of a fourth or compensator lens group L4. At the opposite or front end of the lens barrel member 1 there is shown a helicoid portion 1d meshing with a helicoid portion 6a of a front barrel member 6 which fixedly carries a lens holder or cell 4 containing a second or focusing lens group L2 operative to effect focusing operation. A fasterner screw 2c fixes the holder 2b of the first lens group L1 to the lens barrel member 1.

A focal length scale bearing sleeve 2d is affixed to the lens barrel member 1 by a screw 2e.

Movably arranged in the interior of the lens barrel member 1 are a third or variator lens group L3 and the fourth or compensator lens group L4 arranged by lens holder members 8 and 10.

An actuator member 12 of the zoom lens assembly is fitted through an intermediate sleeve 14 and through a zoom sleeve 16, to be described more fully hereinafter, on the lens barrel member 1 so as to be axially movable and rotatable relative thereto. The intermediate sleeve 14 is fixed to the actuator member 12 by a fastener screw 14b and includes a helicoid portion 14b at the opposite end thereof. The actuator member 12 has a longitudinal groove 12a formed in a portion of the inner surface thereof. Engaged in the longitudinal groove 12a is a pin 6b which extends radially outwardly from the rearwardly extended sleeve portion of the front barrel member 6 so that when the actuator member 12 is rotated about the optical axis, the front barrel member 6 will be turned about the optical axis while being axially moved by virtue of the engagement of the helicoid portions 1d and 6a. Thus, the focusing lens group L2 will be adjusted in a position to suit a given object distance.

The zoom sleeve 16 is arranged between the intermediate sleeve 14 and the lens barrel member 1 and has a helicoid portion 16a meshing with the helicoid portion 14a of the intermediate sleeve 14, with a cutout 16b being formed in a portion of the front end thereof, as shown in FIG. 4a. A lens holder member 10 for the fourth or compensator lens group L4 is movably fitted in the inner diameter of the lens barrel member 1 with a pin 10b extending radially outwardly therefrom into the arcuate slot 1c so that axial movement of the lens group L4 will be controlled by the configuration of the arcuate slot 1c.

A guide member 18 of the variator lens group L3 has a portion 18d fitted in an arcuate slot 10a of the lens holder member 10 and a portion 18c passing through the longitudinal slot 1a of the lens barrel member 1 to the zoom sleeve 16 and fixed thereto by a screw 8b, with the opposite end fixed to the lens holder member 8 by a screw 8a.

As shown in FIG. 4a, the lens holder member 8 for the lens L3 is fixed in a circumferential groove 16c formed in the inner surface of the zoom sleeve 16 by a screw 8a.

The zoom sleeve 16 and the intermediate sleeve 14 are engaged with each other by a helicoid connection formed of the helicoids 16a and 14a so that when focusing, as the zoom sleeve 16 is restrained from rotation by engagement of the holding member 18 in the longitudinal slot 1a, the actuator member 12 and the intermediate sleeve 14 will be rotated about the optical axis. Rotation of the actuator member 12 and of the intermediate sleeve 14 about the optical axis will be limited by engagement of a stopper 19 fixed on one end of the zoom sleeve 16 with a stopper 15 mounted on the inner surface of the intermediate sleeve 14. The stopper 19 is fixed to the zoom sleeve 16 by the screw 11.

In the embodiment of the invention depicted, the zoom sleeve 16 is arranged between the actuator member 12 and the lens barrel member 1 so that upon axial movement of the actuator member, zooming is effected and so that upon rotative movement about the optical axis, closeup operation is effected. When in zooming operation, the actuator member 12 and the zoom sleeve 16 are, has been previously mentioned, moved axially in unison as a result of the helicoids 14a and 16a. When in closeup operation, the zoom sleeve 16 is held in the wide angle position. For this purpose, there are provided connecting means which include a spring member 22, a changeover plate 24, and constituent parts.

The spring member 22 is affixed at one end to one end of the zoom sleeve 16 and on the outer surface thereof by means of screws 22a and it is folded back at the opposite end thereof to form a free end 22b. The changeover plate 24 is affixed to the lens barrel member 1. The intermediate sleeve 14 has a cutout portion 14c into which the folded portion 22b of the spring member 22 enters. A part of the free end 22b extends toward the cutout 16b of the zoom sleeve 16.

The lens assembly of the invention includes diaphragm means which are generally of a known construction and are familiar to those skilled in the art and thus are not herein described in detail. The diaphragm means include a diaphragm setting member 26 fitted on the lens barrel member 1 to transmit a preset aperture information signal through a signal transmission member 28 to a diaphragm unit 30.

Figure 2:
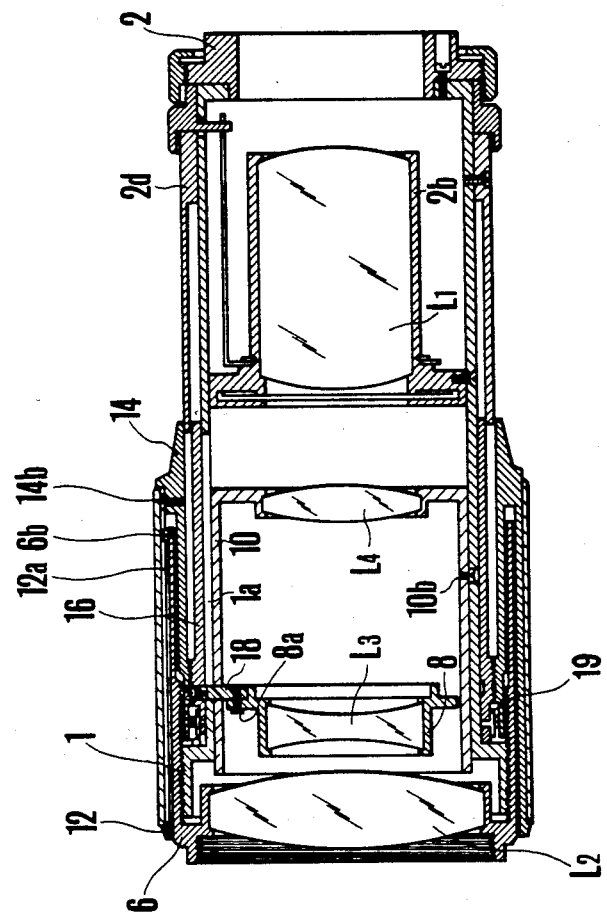
FIG. 2 is a similar view of the assembly of FIG. 1 shown in the position for the shortest focal length.
Figure 3:
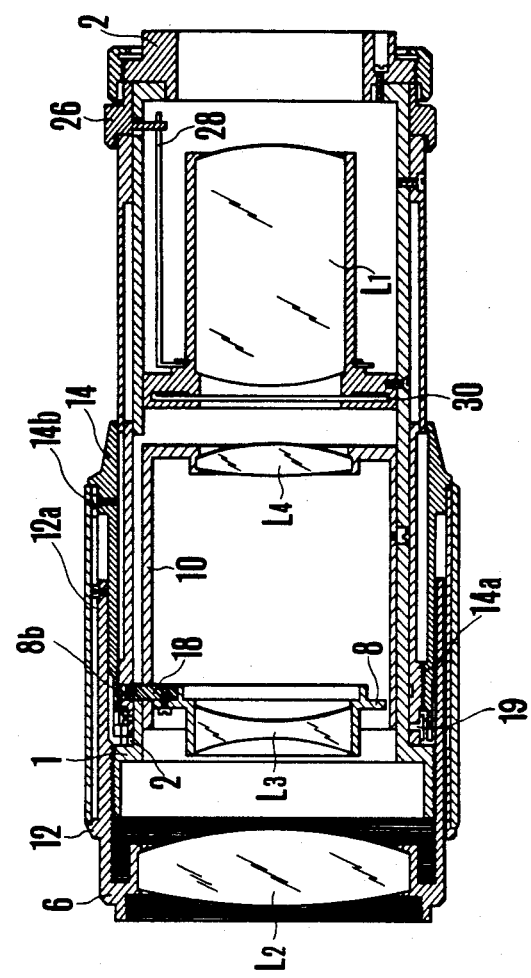
FIG. 3 is a view similar to FIGS. 1 and 2 with the assembly shown moved from the position of FIG. 2 to the closeup position.

As previously indicated, the embodiment of the invention depicted in FIGS. 1 and 2 is illustrated with the various constituent parts thereof shown when the actuator member lies in the position for the longest focal length and the shortest focal length, respectively. In the operation of this embodiment, when the actuator member is axially moved from the position of FIG. 1, the variator lens L3 which operates to effect the function of magnification variation, is moved axially along with the actuator member 12 inasmuch as the lens L3 is fixed through the guide means 18 to the zoom sleeve 16.

At this time, the holder member 10 of the compensator lens group L4 has imparted thereto rotative movement by the guide means 18 engaging in the inclined slot 10a as the guide means is moved along the longitudinal slot 1a while at the same time being moved axially forwardly by the pin 10b engaging in the arcuate slot 1c whereby a compensation effect for the optical system is accomplished with the magnification varying effect of the lens group L3.

As a result of the straight axial forward movement of the actuator member 12, the third lens group L3 is axially moved in unison with the actuator member and the fourth lens group L4 is axially moved in accordance with the degree of displacement of the arcuate slot 1c. During this phase of operation, the first lens group L1 and the second lens group L2 remain in their constant positions.

In order to effect focusing, the actuator member 12 is rotated about the optical axis whereby rotative motion is transmitted through engagement of the longitudinal slot 12a of the actuator member 12 with the pin 6b on the front barrel member 6 to the front barrel member 6, thus adjusting the position of the second lens group L2 by virtue of the helicoid connection to the tubular body 1 effected by the helicoids 1a and 6a.

Rotative actuation of the actuator member 12 when operating in focusing range is stopped by operation of the stoppers 19, 15.

When axial movement of the actuator 12 from the position of FIG. 1 to the position of FIG. 2 is followed by rotative actuation thereof, the optical system will be moved into the closeup range.

Figure 6:
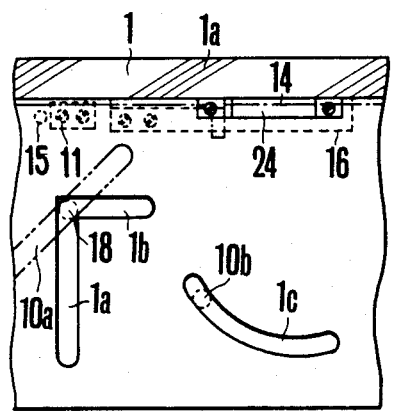
Figure 7:
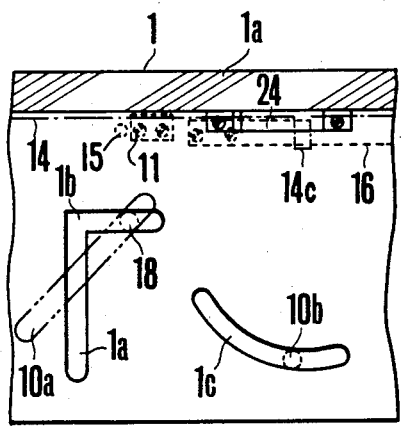

That is, when the actuator member 12 is rotated from the wide-angle position shown in FIG. 2, the aforementioned stoppers 19 and 15 will come into contact with each other. Upon further rotation of the actuator member 12 in the same direction, the portion 18c of the guide means 18 enters the transverse slot 1b of the lens barrel member 1 and the actuator member 12 and the zoom sleeve 16 will be rotated in unison about the optical axis. As illustrated in FIGS. 6 and 7, this rotation of the zoom sleeve 16 causes the guide means 18 to be moved along therewith and the fourth lens group L4 will be moved according to the arcuate slot 1c of the lens barrel 1 while the second lens group L2 will be simultaneously axially moved. Thus, the various lens groups will be arranged in the position shown in FIG. 3 for extreme closeup photography.

With regard to the connection operation of the actuator member 12 and the zoom sleeve 16 when the aforementioned closeup operation is performed, when the transition from the wide angle position to the closup range is effected, the zoom sleeve 16 is rotated toward the closeup range by the stoppers 19 and 15. However, when it is desired to return from the closeup position of FIG. 3 to the wide angle position, the stoppers 19 and 15 are moved apart in directions to separate them from each other and thus the zoom sleeve 16 will be left in the closeup position. As a result of this, when a transition occurs from the wide angle position of FIG. 6 to the closeup position of FIG. 7, the spring member 22 fixed on the outer surface of the zoom sleeve 16 is turned while riding on the changeover plate 24 with the free end 22b thereof entering into the cutout portion 14b of the intermediate sleeve 14. When a transition occurs from the closeup position of FIG. 7 to the ordinary range of FIG. 6, the zoom sleeve 16, while being maintained in connection with the intermediate sleeve 14 by the spring 22 engaging in the cutout 14c, is rotated in unison with the actuator member 12. Thus, when moved to the position of FIG. 6, the spring 22 is taken out of riding engagement with the changeover plate 24 whereby the zoom sleeve 16 is released from the connection with the intermediate sleeve 14.

As indicated in the foregoing, the present invention utilizes only one actuator member in performing zooming, closeup, and focusing operations. When in the closeup range, the lens group L4 of the lens system is moved forwardly along the arcuate slot 1c. By the straight forward movement and rotative movement of the actuator 12 for this purpose, movement of the lens group L4 is controlled since the zoom sleeve 16 is controlled. Through the zoom sleeve 16, zooming, closeup and focusing adjustment by means of a single actuator member 12 are made possible and the structure of the changeover mechanism to a closeup range is significantly simplified.

Furthermore, in accordance with the present invention, the arcuate slot 1c for controlling movement of the lens group L4 when in zooming range is utilized to accomplish movement of the lens group L4 in the closeup range when closeup photography is to be performed. For this reason, as is well known in the art, the necessity for providing a cam slot for movement of the optical system to closeup range during transition from the zooming range to the closeup range, which is enabled by elongation of the cam slot 1c is precluded. Thus, it is possible to increase the physical strength of the sleeve member and of the lens mounting, or to decrease the weight and diameter, as a result of the fact that reduction of the thickness of the sleeve member is enabled and there is further accomplished provision of a lens mounting mechanism which contributes to a reduction in costs due to reduction in the portions which are to be machined.

Furthermore, in the lens mounting system constructed in accordance with the embodiment of the invention described, changeover from the ordinary zooming range to the closeup range involves engagement-disengagement action in response to operation of the actuator member. Therefore, there is no need for an operator to remove his hand from the actuator member and to then manipulate an operating member for the changeover as would otherwise be necessary in prior art structures.

It should be noted that in the embodiment of the present invention described, the zoom sleeve 16 and the actuator member 12 are screw-connected to the intermediate sleeve 14. Therefore, by increasing the length of the threaded portion for the screw connection, it is possible to heighten the performance of the zoom lens mounting mechanism disclosed. That is, portions connected by the screws 14a and 16c which have found general use in the prior art are different from those disclosed in the present embodiment, since there is a direct connection to the holder member of the variator lens group without recourse to the intermediate sleeve 14. The use of conventional construction configurations, however, gives rise to a problem in that the axial support portion is reduced to a point causing the actuator member to be inclined with respect to the axial direction and therefore causing axial movement of the actuator member while frictionally engaged against the other members to be offset or tilted. In the case of the present embodiment the screw-connected portion may be increased in length so that the axial support portion is in surface contact whereby the aforementioned drawback of the actuator member 12 is eliminated.

Furthermore, in the present embodiment of the invention, the holder member 8 for the third lens group L3 may be formed of a synthetic resin material by mold casting techniques, thereby making it possible to significantly reduce production costs for the lens mounting mechanism. Additionally, it is possible to substitute a readily machinable material of good endurance characteristics for the metallic material which is conventionally used.

As previously described, an intermediary sleeve is inserted between the operation member and the fixed barrel and the intermediary sleeve is connected to the variator lens system so as to effect straight movement at the time of zooming and forward driving movement by rotation operation at the time of closeup. With these structural features, performance of the barrel is improved and continuous operation by a single operating member is made possible.

The second embodiment of the invention, depicted principally in FIGS. 8-16, comprises a tubular body or lens barrel 100 for the lens mounting system connected at one end thereof by a screw 102a to a mount member 102 provided with mounting means for coupling the lens assembly to an attachment portion of a comera body (not shown).

In the portion of the mount member 102 there is held a relay lens group L1. A fastener screw 102c connects a holding member 102b for the first lens group L1 to the lens barrel member 100.

At the opposite end of the lens barrel member 100 there is shown a front barrel member 106 which fixedly carries a holder member 104 containing a second lens group L2 and which is connected to the lens barrel member 100 through threaded engagement of helicoids 100a and 106a. An intermediate sleeve 102d having a focal length scale is fixed to the lens barrel member 100 by a screw 100e.

Figure 11:
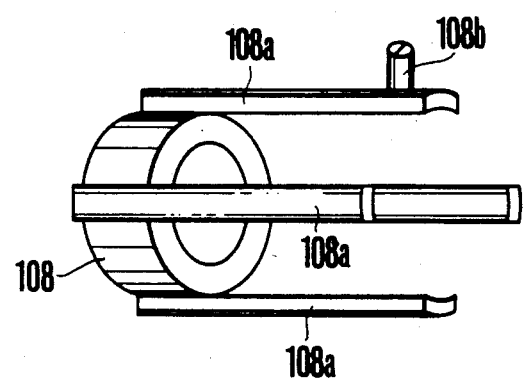
FIGS. 11–15 are perspective views of principal parts of the zooms lens mounting mechanism of the embodiment of the lens assembly of FIGS. 8–10, with FIG. 11 depicting a lens holder member for a third or variator lens group, FIG. 12 depicting a lens holder for a fourth or compensator lens group, FIG. 13 depicting a tubular body or lens barrel member, FIG. 14 depicting a cam sleeve, and FIG. 15 depicting an intermediate sleeve.
Figure 12:
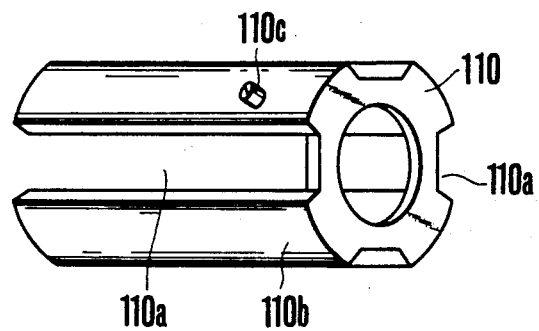
Figure 13:
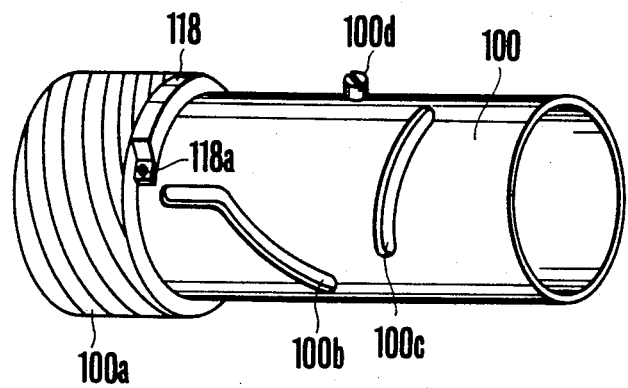
Figure 14:
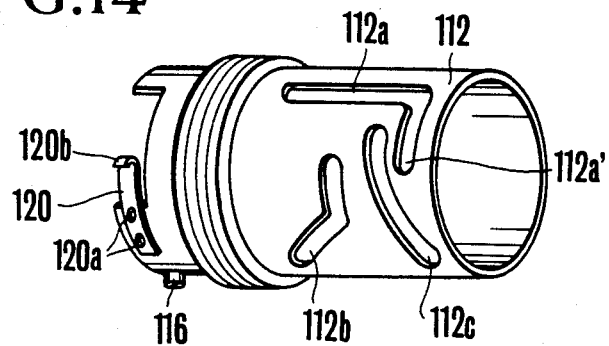
Figure 15:
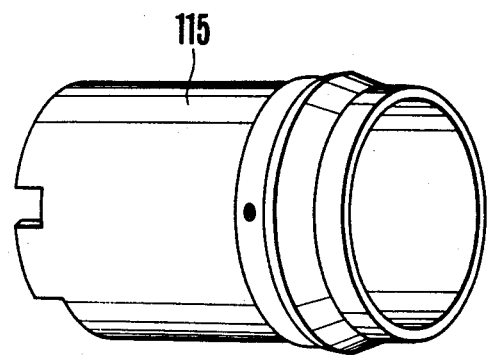

In the interior of the lens barrel member 100 there are movably arranged a variator lens group L3 and a compensator lens group L4 mounted in lens holders 108 and 110 shown in FIGS. 11 and 12. The lens holder 108 of the third lens group L3 which is shown in FIG. 11 is formed with elongated arms 108a inserted in respective cutouts 110a of the lens holder 110 for the fourth lens group L4. Guide pins 108b and 110c are mounted on respective armed portions 108a and 110b and engage in respective slots 100b and 100c provided in the lens barrel member 100 of FIG. 13 so that the control of movement is enabled by the slots 100b and 100c. Fitted on the outer diameter of the lens barrel member 100 is a cam member 112 having a first cam slot 112a, a second cam slot 112b, and a third cam slot 112c.

Engaged in the first cam slot 112a is a guide pin 100d mounted on the lens barrel member 100. The second cam slot 112b forms a cross point together with the cam lot 100b at which a guide pin 108b of the lens holder member 108 engages (see FIG. 16). The third cam slot 112c forms a cross point together with the cam slot 100c at which a guide pin 110c of the lens holder member 110 engages (see FIG. 16).

An actuator member 114 is fitted on the outer diameter of the lens barrel and is provided with a longitudinal slot 114a into which the pin 106b mounted on the front barrel member 106 extends. When the actuator member 114 is axially moving, the second lens group L2 remains unchanged in position. When the actuator member 114 is rotated about the optical axis, the front barrel member 106 is axially moved by virture of the threaded engagement between the members 100a and 106a of the lens barrel member 100 and the front barrel member 106, respectively.

An interconnecting sleeve 115 is positioned between the actuator member 114 and the cam member 112 and is fixed to the actuator member 114 by a screw 114b as the fastening means. The inner connecting sleeve 115 is engaged with the cam member 112 by means of helicoids 112a, 115a, and the actuator member 114 and the cam member 112 are moved together by the operation of the actuator member 114 along the optical axis, with only the actuator member 114 being rotated by the operation of the actuator member around the optical axis. At one end of the inner connecting member 115, a stop portion is formed which engages with the stopper 116 fixed on the came member 112.

A changeover plate 118 for closeup photography is fixedly mounted on the lens barrel member 100. A spring plate 120 for closeup photography is mounted on the cam member 112. The changeover plate 118 and the spring member 120 cooperate with each other in order to control the transition between the zooming range and the closeup range.

In the operation of this embodiment of this invention, when the actuator member 114 is axially moved, the actuator member 114, the interconnecting sleeve 115, and the cam member 112 are axially moved in unison since the interconnecting sleeve 115 is restrained from axial movement between the restrict member 116 and the cam member 112. This amount of movement of the actuator member is determined by the axial length of the first cam slot 112a of the cam member 112 and the pin 100d mounted on the tubular member 100.

Figure 16:
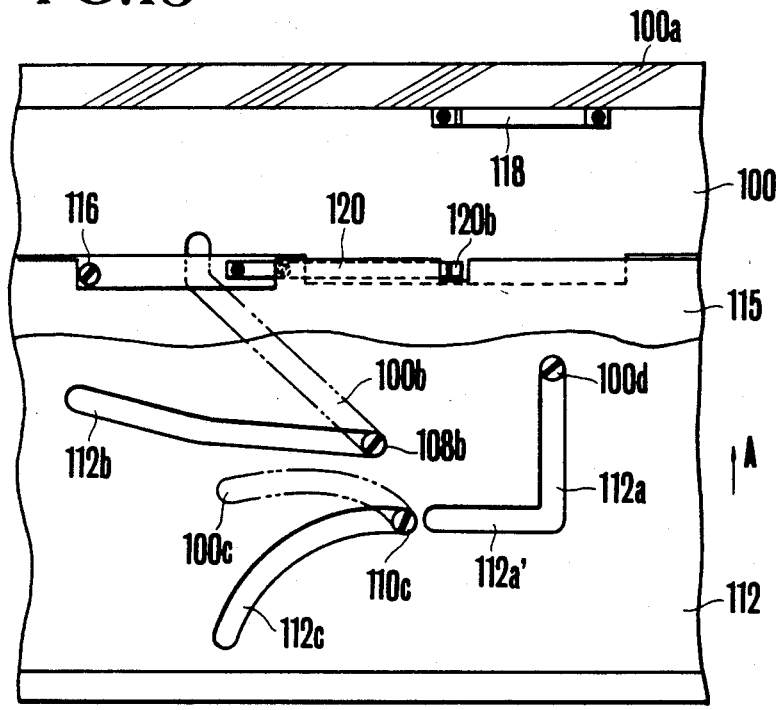
FIGS. 16–18 are developed representations of the cam sleeve of FIG. 14 showing working conditions of the lens holders and connecting means and three different stations of the actuator member of the assembly for telephoto, wide angle, and closeup settings.
Figure 17:
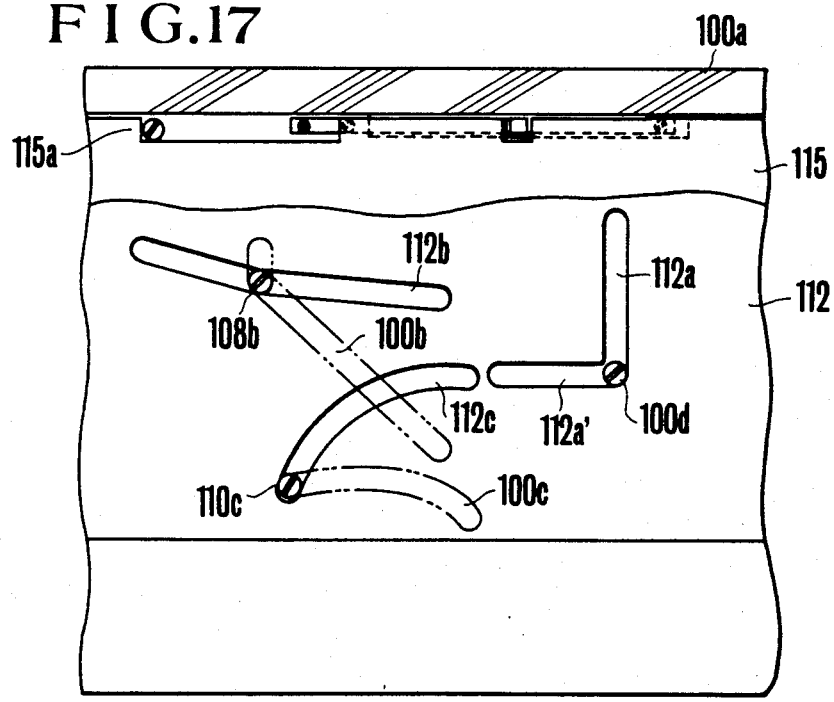

Such axial movement of the actuator member 114 and cam member 112 will cause the third lens group L3 to move not only axially forward, but also to be rotatively moved along the cam slot 100b of the lens barrel member as the cam member 112 is moved in the direction of arrow A by the guidance of the pin 100d engaging in the longitudinal slot 112a, as shown in FIGS. 16 and 17, inasmuch as the pin 108b mounted on the lens holder member 108 extends through the cam slot 100b of the lens barrel member into the cam slot 112b of the cam member 112. At the same time, the fourth lens group L4 is axially moved as the cam member 112 moves axially since the guide pin 100c engages in the longitudinally elongated cam slot 112c of the cam member 112 and the cam slot 100c in the lens barrel member 100 at the cross point thereof. Thus, the third lens group L3 and the fourth lens group L4 are axially moved in differential relationship to each other while varying the image magnification and while effecting compensation of aberrations.

As indicated in the foregoing, the axial movement: of the actuator member 114 causes axial movement of the third lens group L3 and of the fourth lens group L4 along the cams 100b and 100c provided in the tubular body 100 which, in turn, cause variation of magnification of the object image while effecting image shift compensation. When the actuator member is rotated about the optical axis, engagement of the pin 106b mounted on the front barrel 106 with the longitudinal slot 114a provided in the actuator member 114 transmits rotation of the actuator member 114 to the front barrel member 106 which, in turn, is translated to an axial forward movement of the second lens group L2 by the helicoid connection of the helicoids 106a and 100a of the front barrel 106 and of the lens barrel member 100, thus effecting adjustment of the focusing.

During the focusing operation by rotation of the actuator member 114 about the optical axis, the holder member 108 and 110 remain stationary about the optical axis. Thus, as the pin 100d is inserted in the longitudinal slot 112a of the cam member 112, the cam member 112 is prevented from rotating and remains still even when the actuator 114 rotates, the holder members 108, 100 maintain their positions.

Figure 8:
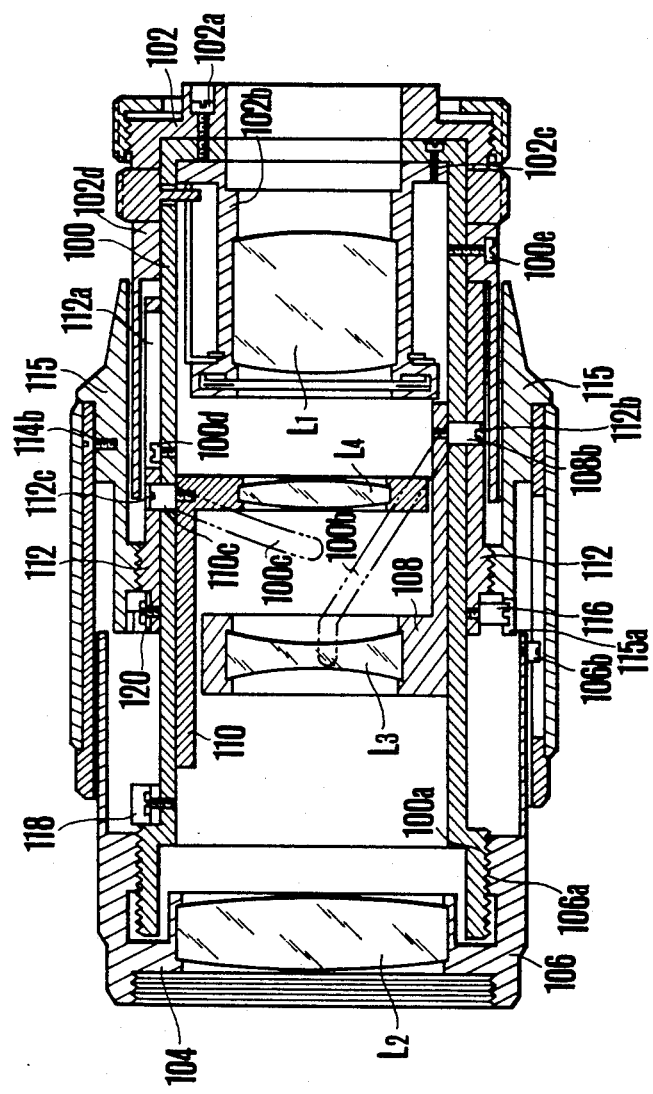
FIG. 8 is a longitudinal sectional view of another embodiment of a zoom lens mounting mechanism in accordance with the present invention shown in the position for the longest focal length.
Figure 9:
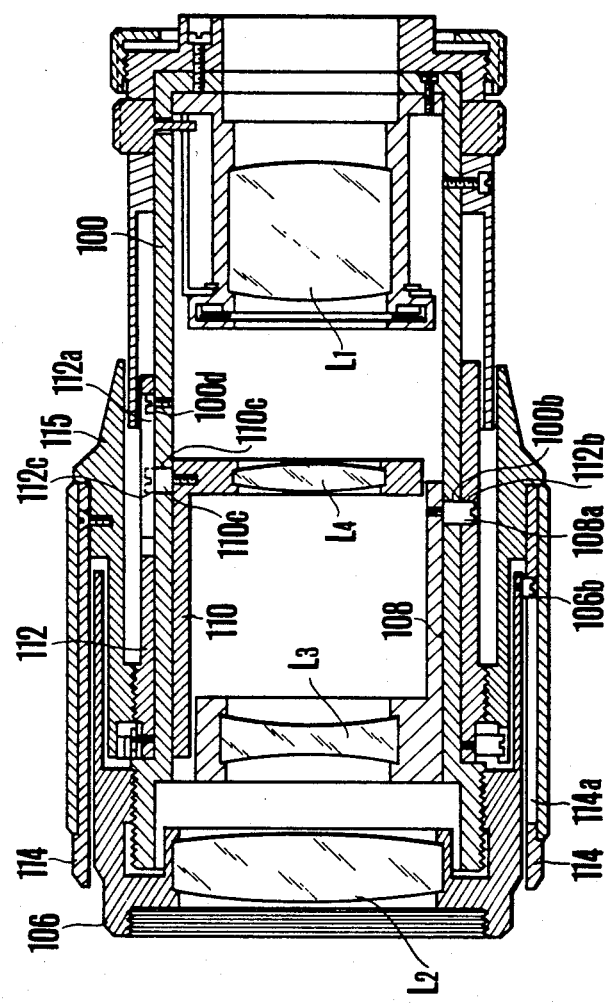
FIG. 9 is a view similar to FIG. 8 showing the lens assembly in a position for the shortest focal length.
Figure 10:
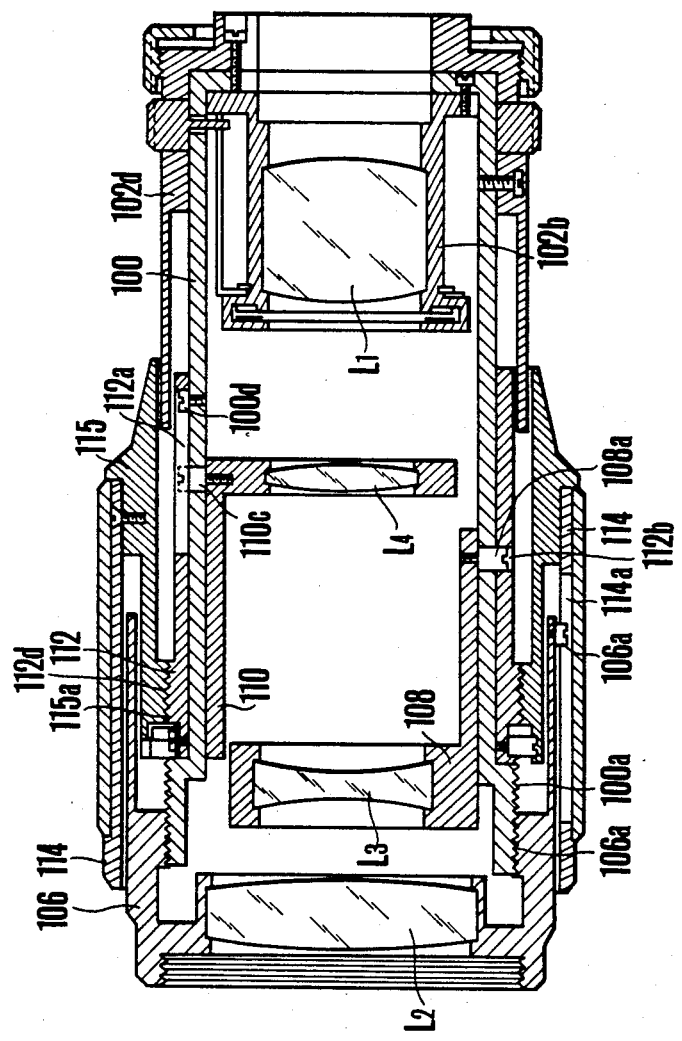
FIG. 10 is a view similar to FIGS. 8 and 9 showing the lens assembly turned from the position of FIG. 9 to a closeup position.

During operation in the closeup range, the actuator member 114 is moved forward from the telephoto position of FIGS. 8, 16 to the wide angle position of FIGS. 9 and 17. In this latter position, the pin 100d on the lens barrel member 100 assumes a point shown in FIG. 17.

Figure 18:
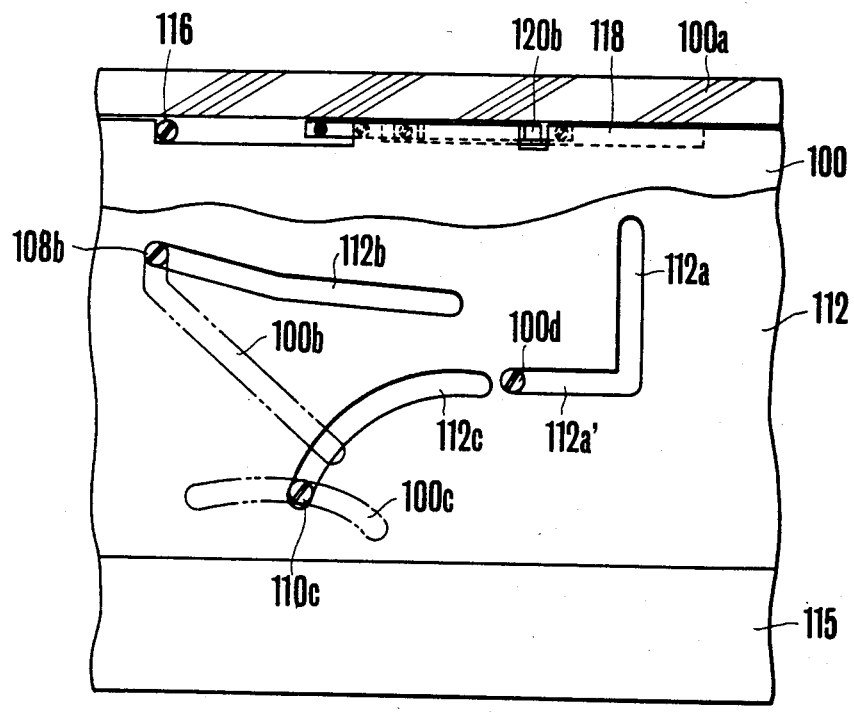

Upon subsequent rotation of the actuator member 114 toward the closeup position, the end portion 115a of the interconnecting sleeve and the pin 116 on the cam member 112 are brought into abutting engagement so that the actuator member 114, the interconnecting sleeve 115 and the cam member 112 are turned in unison about the optical axis with the guide pin 100d on the tubular body entering the slot 112a' provided contiguously with the slot 112a which extends parallel with the axis of the cam member 112. By this motion of the various members, the guide pins 108b and 110c of the holders for the lens groups L3 and L4 are moved from the position of FIG. 17 to the position of FIG. 18 where the third and fourth lens groups are ready for closeup photography.

Thus, when it is desired to effect transition from the closeup range to the ordinary zooming range, the actuator member 114 must be rotated in the opposite direction. Since the pin 116 and the end portion 115a of the interconnecting sleeve 115 are moved to separate from each other as in the first embodiment previously described, it is necessary to forcibly bring the cam member 112 back along with the actuator member. For this purpose, there are provided a changeover plate 118 and a spring member 120. Since the structure and arrangement of these parts is similar to that of the changeover plate 24 and the spring 22 disclosed in connection with the description of the first embodiment of the invention, a more detailed description is omitted and reference is made to the description of the first embodiment.

In this embodiment of the invention, the compensator lens group L4 is moved by engagement of the pin 110c on the holder member 110 in the slot 100c provided in the lens barrel member 100 and the slot 112c provided in the cam member 112 at the cross point thereof. For this reason, movement of the compensator lens group L4 may be accurately controlled.

While specific embodiments of the invention have been shown and described in detail to illustrate the application of the inventive principles, it will be understood that the invention may be embodied otherwise without departing from such principles.

What is claimed is:

1. A zoom lens assembly capable of selectively performing a zooming operation and a closeup operation, comprising:
   (a) a single operational member for effecting focusing by rotation thereof around the optical axis of said lens assembly, and for effecting zooming operation by axial movement thereof;
   (b) first and second lens mounting members containing a first movable lens group and second movable lens group;
   (c) a lens barrel member having first and second guide means for controlling movement of said first and second lens mounting members in response to axial movement of said single operational member so as to perform said zooming operation, and third guide means associated with said first guide means to effect said closeup operation;
   (d) an intermediary sleeve connected to said single operational member so as to be freely rotatable around the optical axis and arranged to move together with said single operational member in the axial direction;
   (e) means for controlling movement of said first and second lens mounting members by movement of said single operational member along the optical axis, said control means unitarily combining said first lens mounting member with said intermediary sleeve so as to move the first lens mounting member along the first and third guide means of the lens barrel and to move the second lens mounting member along the second guide means of the lens barrel;
   (f) first connecting means between said single operational member and said intermediary sleeve, said first connecting means connecting said single operational member to said intermediary sleeve when said single operational member is rotated toward the closeup range from the focusing range so as to make the first and second lens mounting members movable to the closeup range by rotation of said intermediary sleeve around the optical axis; and
   (g) second connecting means between said single operational member and said intermediary sleeve, said second connecting means connecting said intermediary sleeve to said single operational member when said single operational member is moved toward the zooming range from the closeup range so as to restore the intermediary sleeve to the zooming range and to release the connection when the single operational member comes into the zooming range.

2. A zoom lens assembly according to claim 1 wherein said second connecting means comprise:
   a stopping member attached to one of said intermediary sleeve and said single operational member;
   a stopping portion formed on one of said intermediary sleeve and said single operational member; and
   means for releasing the stopping of said stopping member.

3. A zoom lens assembly according to claim 2 wherein said stopping member is a spring plate fixed at one end, wherein said stopping portion has a notched portion engageable with the free end of said spring plate provided in said intermediary sleeve or said single operational member, and wherein said stopping releasing means comprises a projection formed on the outer circumference of said lens barrel member.

4. A zoom lens assembly comprising:
   first and second lens mounting members for holding first and second movable lens groups capable respectively of performing a zooming operation and a closeup operation;
   a lens barrel member;
   a single operational member enabling zooming operation by straight movement thereof in a direction parallel to the optical axis of said lens assembly and enabling a focusing operation and closeup operation by rotation thereof around the optical axis;
   an intermediary sleeve connected to said single operational member so as to be freely rotatable around the optical axis and so as to move together with said single operational member in the direction of the optical axis;
   first connecting means for connecting said single operational member to said intermediary sleeve when said single operational member is at a point of changeover between the focusing range and the closeup range so as to make said intermediary sleeve rotatable around the optical axis; and
   second connecting means provided between said single operational member and said intermediary sleeve for restoring said intermediary sleeve to the zooming range as said single operational member is returned from the closeup range to the zooming range.

* * * * *